United States Patent

Sugimura et al.

(10) Patent No.: US 9,428,596 B2
(45) Date of Patent: Aug. 30, 2016

(54) METHOD OF PRODUCTION OF MODIFIED CONJUGATED DIENE-BASED RUBBER

(71) Applicant: ZEON CORPORATION, Tokyo (JP)

(72) Inventors: Takeshi Sugimura, Tokyo (JP); Kazuya Ito, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/369,657

(22) PCT Filed: Dec. 27, 2012

(86) PCT No.: PCT/JP2012/083810
§ 371 (c)(1),
(2) Date: Jun. 27, 2014

(87) PCT Pub. No.: WO2013/100022
PCT Pub. Date: Jul. 4, 2013

(65) Prior Publication Data
US 2014/0364559 A1    Dec. 11, 2014

(30) Foreign Application Priority Data

Dec. 28, 2011 (JP) ................................. 2011-287506

(51) Int. Cl.
| | | |
|---|---|---|
| C08C 19/25 | (2006.01) |
| C08F 8/42 | (2006.01) |
| C08K 3/36 | (2006.01) |
| C08C 19/44 | (2006.01) |
| C08F 4/46 | (2006.01) |
| C08F 36/04 | (2006.01) |
| C08F 36/06 | (2006.01) |

(52) U.S. Cl.
CPC .................. *C08F 8/42* (2013.01); *C08C 19/25* (2013.01); *C08C 19/44* (2013.01); *C08F 4/466* (2013.01); *C08F 36/04* (2013.01); *C08F 36/06* (2013.01); *C08K 3/36* (2013.01); *C08F 2810/40* (2013.01)

(58) Field of Classification Search
CPC .................................................... C08C 19/25
See application file for complete search history.

(56) References Cited

U.S. PATENT DOCUMENTS

| | | |
|---|---|---|
| 4,161,494 A | 7/1979 | Sigwalt et al. |
| 4,236,035 A | 11/1980 | Sigwalt et al. |
| 4,311,818 A | 1/1982 | Sigwalt et al. |
| 2005/0070672 A1 | 3/2005 | Ozawa et al. |
| 2010/0280173 A1 | 11/2010 | Ozawa et al. |
| 2012/0071603 A1* | 3/2012 | Hayano .................. C08C 19/44 524/571 |
| 2014/0011909 A1* | 1/2014 | Satou .................. B60C 1/0016 523/155 |

FOREIGN PATENT DOCUMENTS

| | | | |
|---|---|---|---|
| CN | 102020752 A | | 4/2011 |
| EP | 1 449 857 A1 | | 8/2004 |
| GB | 1 555 729 | | 11/1979 |
| JP | 3-294315 A | | 12/1991 |
| JP | 2000-122327 A | | 4/2000 |
| JP | 2006-306962 A | | 11/2006 |
| WO | WO 2010/131646 | * | 11/2010 |
| WO | WO 2010/131646 A1 | | 11/2010 |
| WO | WO 2012/073837 | * | 6/2012 |

OTHER PUBLICATIONS

International Search Report, mailed Mar. 12, 2013, issued in PCT/JP2012/083810.
European Search Report issued in European Patent Application No. EP 12862404.6, dated Aug. 13, 2015.

* cited by examiner

*Primary Examiner* — Robert C Boyle
(74) *Attorney, Agent, or Firm* — Birch, Stewart, Kolasch & Birch, LLP

(57) ABSTRACT

A method of production of modified conjugated diene-based rubber comprising a steps of using, as a polymerization initiator, an alkali metalated aromatic compound which has three or more carbon atoms which are directly bonded to alkali metal atoms and aromatic rings in one molecule so as to polymerize a monomer which contains at least a conjugated diene compound and reacting a compound of the following general formula (I) with an active ends of the obtained polymer is provided.

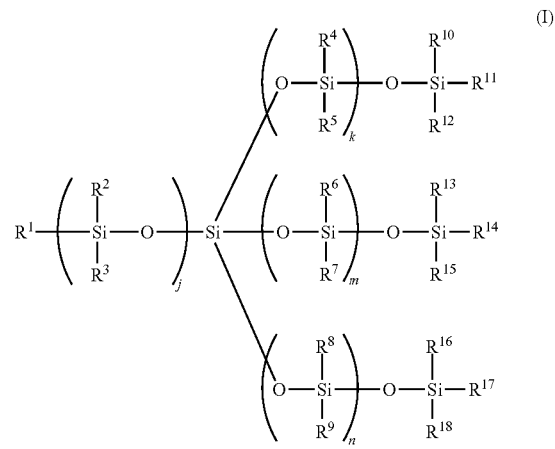

(In the general formula (I), any one of $R^1$ and $R^{10}$ to $R^{18}$ is an atom or reactive group which can react with the active ends of said polymer or a hydrocarbon group which includes either of the same, the remaining among $R^1$ and $R^{10}$ to $R^{18}$ and $R^2$ to $R^9$ are respectively independently a hydrogen atom, alkyl group, or aryl group, and "j", "k", "m", and "n" are integers of 0 to 100.)

10 Claims, No Drawings

US 9,428,596 B2

METHOD OF PRODUCTION OF MODIFIED CONJUGATED DIENE-BASED RUBBER

TECHNICAL FIELD

The present invention relates to a method of production of modified conjugated diene-based rubber, more particularly relates to a method for producing modified conjugated diene-based rubber which is excellent in processability and which can give a rubber cross-linked product which is provided with low heat buildup and abrasion resistance. Further, the present invention relates to a modified conjugated diene-based rubber which is obtained by this method of production, a rubber composition which contains this modified conjugated diene-based rubber, and a rubber cross-linked product of the same.

BACKGROUND ART

In recent years, due to environmental issues and resource issues, low heat buildup has been strongly demanded in the tires of automobiles. Further, from the viewpoint of durability, excellent abrasion resistance has been sought. A tire which is obtained from a rubber composition which contains silica is superior in low heat buildup compared with a tire which is obtained from a rubber composition which contains the usually used carbon black, so this can be used to produce a tire helping to realize lower fuel consumption.

In such a rubber composition, to raise the affinity of the rubber and silica, the art is known of making a modifier react with the polymerizing active ends of the rubber etc. so as to introduce functional groups with a high affinity to silica.

For example, Patent Document 1 discloses using an organolithium catalyst which is prepared from a polyvinyl aromatic compound and lithium in a predetermined molar ratio so as to polymerize a conjugated diene-based monomer, reacting a modifier with the obtained polymerizing active ends, and adding silica or other filler to the thus modified conjugated diene-based rubber to obtain a rubber composition. However, in the art of the above Patent Document 1, while the affinity of the rubber and silica is improved, there are the problems that the low heat buildup property is not sufficient and, further, the abrasion resistance is inferior. Therefore, when used as rubber for a tire, the required properties can not necessarily be satisfied.

As opposed to this, for example, Patent Document 2 discloses a method of production of a radial conjugated diene polymer which uses an alkali metalated aromatic compound which hays three or more carbon atoms which are directly bonded to alkali metal atoms and aromatic rings in one molecule as a polymerization initiator and polymerizes a monomer mixture which contains at least a conjugated diene compound. In this Patent Document 2, the conjugated diene polymer is made one which has a radial structure so as to improve the affinity with silica or other filler when adding the filler and thereby enable improvement of the low heat buildup and abrasion resistance.

PRIOR ART DOCUMENTS

Patent Documents

Patent Document 1: Japanese Patent Publication No. 2006-306962A
Patent Document 2: WO 2010/131646A

SUMMARY OF THE INVENTION

Problem to be Solved by the Invention

However, according to the rubber composition which is obtained by adding a filler to a radial conjugated diene polymer which is obtained by the method of production described in this Patent Document 2, while the low heat buildup and abrasion resistance can be improved, from the viewpoint of further improvement in performance, further improvement of the low heat buildup and abrasion resistance is desired. Further, in this Patent Document 2, the active ends of the obtained radial conjugated diene polymer are modified by a modifier to thereby try to improve the low heat buildup and abrasion resistance, but in the art of this Patent Document 2, depending on the type of the modifier which is used and the modification conditions, part of the radial conjugated diene polymer ends up gelling and, therefore, there was also the problem that sometimes the processability ends up deteriorating.

The present invention was made in consideration of such an actual situation and has as its object the provision of a method for producing a modified conjugated diene-based rubber which is excellent in processability and can give a rubber cross-linked product which is provided with low heat buildup and abrasion resistance.

Means for Solving the Problems

The inventors etc. engaged in intensive research to achieve the above object and as a result discovered that by using, as a polymerization initiator, an alkali metalated aromatic compound which has three or more carbon atoms which are directly bonded to alkali metal atoms and aromatic rings in one molecule so as to polymerize a monomer which contains at least a conjugated diene compound and by making a predetermined modifier react with the active ends of the obtained conjugated diene-based rubber, a modified conjugated diene-based rubber which is excellent in processability and can give a rubber cross-linked product which is provided with low heat buildup and abrasion resistance is obtained and thereby completed the present invention.

That is, according to the present invention, there is provided a method of production of modified conjugated diene-based rubber comprising a first step of using, a polymerization initiator, an alkali metalated aromatic compound which has three or more carbon atoms which are directly bonded to alkali metal atoms and aromatic rings in one molecule so as to polymerize a monomer which contains at least a conjugated diene compound and obtain a conjugated diene-based rubber which has active ends and a second step of reacting a compound of the following general formula (I) with the active ends of the conjugated diene-based rubber which has active ends.

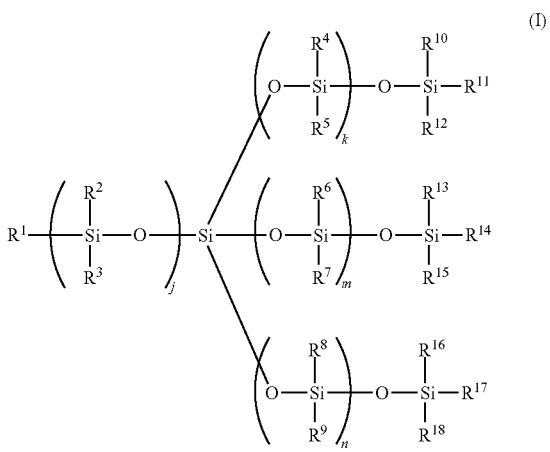

(In which general formula (I), any one of $R^1$ and $R^{10}$ to $R^{18}$ is an atom or reactive group which can react with the active ends of the conjugated diene-based rubber which has active ends or a hydrocarbon group which contains one of either the atom or the reactive group, while the remaining among $R^1$ and $R^{10}$ to $R^{18}$ are respectively independently a hydrogen atom, $C_1$ to $C_{10}$ alkyl group, or $C_6$ to $C_{12}$ aryl group. $R^2$ to $R^9$ are respectively independently a hydrogen atom, $C_1$ to $C_{10}$ alkyl group, or $C_6$ to $C_{12}$ aryl group. "j", "k", "m", and "n" are respectively independently integers of 0 to 100.)

In the method of production of the present invention, in the first step, preferably a monomer which contains an aromatic vinyl compound in addition to the conjugated diene compound is copolymerized.

In the method of production of the present invention, the alkali metalated aromatic compound is one which is obtained by making an aromatic compound which has three or more carbon atoms which are directly bonded to aromatic rings in one molecule react with an organic alkali metal compound.

In the method of production of the present invention, the aromatic compound which has three or more carbon atoms which are directly bonded to aromatic rings in its molecule is preferably an aromatic compound of the following general formula (II).

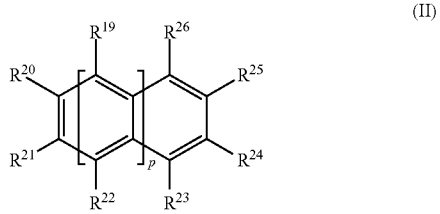

(In the general formula (II), $R^{19}$ to $R^{26}$ are respectively independently a hydrogen atom or $C_1$ to $C_m$ alkyl group and three or more of $R^{19}$ to $R^{26}$ are $C_1$ to $C_{10}$ alkyl groups. "p" is an integer of 0 to 5 and, when "p" is 2 or more, regardless of the structure of the above general formula (II), three or more present benzene rings may be condensed at any positions with each other.)

In the method of production of the present invention, in the general formula (I), the atom or reactive group which can react with the active ends of the conjugated diene-based rubber which has active ends is preferably a halogen atom, vinyl group, alkoxyl group, amino group, or epoxy group.

Further, according to the present invention, there is provided a modified conjugated diene-based rubber obtained by any of the above methods of production.

Furthermore, according to the present invention, there is provided a rubber composition containing a rubber ingredient which contains the above modified conjugated diene-based rubber in 100 parts by weight and silica in 10 to 200 parts by weight.

The rubber composition of the present invention preferably is one which further contains a cross-linking agent.

Further, according to the present invention, there are provided a rubber cross-linked product obtained by cross-linking the above rubber composition and a tire which contains that rubber cross-linked product.

Effects of the Invention

According to the present invention, it is possible to provide a modified conjugated diene-based rubber which is excellent in processability and can give a rubber cross-linked product which is provided with low heat buildup and abrasion resistance and also a rubber composition which contains the modified conjugated diene-based rubber and a rubber cross-linked product which is obtained using the rubber composition and which is provided with low heat buildup and abrasion resistance.

DESCRIPTION OF EMBODIMENTS

Method of Production of Modified Conjugated Diene-Based Rubber

The method of production of modified conjugated diene-based rubber of the present invention comprises a first step of using, as a polymerization initiator, an alkali metalated aromatic compound which has three or more carbon atoms which are directly bonded to alkali metal atoms and aromatic rings in one molecule so as to polymerize a monomer which contains at least a conjugated diene compound and obtain a conjugated diene-based rubber which has active ends and a second step of making a compound of the later explained general formula (5) react with the active ends of the conjugated diene-based rubber which has active ends.

<First Step>

First, the first step in the method of production of the present invention will be explained. In the method of production of the present invention, the first step is a step of using, as a polymerization initiator, an alkali metalated aromatic compound which has three or more carbon atoms which are directly bonded to alkali metal atoms and aromatic rings in one molecule so as to polymerize a monomer which contains at least a conjugated diene compound and obtain a conjugated diene-based rubber which has active ends.

The polymerization initiator which is used in the first step of the method of production of the present invention is an alkali metalated aromatic compound which has three or more carbon atoms which are directly bonded to alkali metal atoms and aromatic rings in one molecule. The alkali metal atoms of the alkali metalated aromatic compound which is used as the polymerization initiator in the present invention are not particularly limited, but lithium, sodium, or potassium is preferable. Among these, lithium is particularly preferable. Further, the aromatic rings of the alkali metalated aromatic compound are also not particularly limited so long as conjugated rings which have aromatic properties. As specific examples, a benzene ring, naphthalene ring, anthracene ring, or other electrically neutral aromatic hydrocarbon ring; cyclopentadienyl anion ring, indenyl anion ring, fluorenyl anion ring, or other aromatic hydrocarbon ring which has a negative charge; a furane ring, thiophene ring, or other aromatic ring which contains a hetero atom; etc. may be mentioned. Among these as well, an electrically neutral aromatic hydrocarbon ring is preferable, while a benzene ring is particularly preferable. An alkali metalated aromatic compound which has electrically neutral aromatic hydrocarbon rings is preferably used from the viewpoint of its stability and polymerizing activity.

Note that, in the alkali metalated aromatic compound used in the present invention, the alkali metal atoms are usually present in the alkali metalated aromatic compound in the state of cations. Further, the carbon atoms which are respectively directly bonded to the alkali metal atoms and aromatic rings are usually present in the state of anions since they are bonded with alkali metal atoms in the state of cations. Further, in the alkali metalated aromatic compound used in the present invention, the alkali metal atoms which are present in the state of cations and the carbon atoms which are present in the state of anions in this way form ion bonds and, due to this, are directly bonded with each other in state.

In the present invention, by using, as a polymerization initiator, an alkali metalated aromatic compound which has three or more carbon atoms which are directly bonded to alkali metal atoms and aromatic rings in one molecule, the respective three or more carbon atoms which are contained in the alkali metalated aromatic compound and to which the alkali metal atoms are directly bonded are used as polymerization starting points for growth of a conjugated diene-based polymer chain accompanied along with the living polymerizing ability, so the obtained conjugated diene-based rubber can be made one which has a radial structure.

Further, in the present invention, the alkali metalated aromatic compound used as the polymerization initiator is not particularly limited in structure so long as it has three or more carbon atoms which are directly bonded to alkali metal atoms and aromatic rings in one molecule, but for example, it may be an alkali metalated aromatic compound where three or more carbon atoms which are directly bonded to alkali metal atoms are directly bonded to one aromatic ring or may be an alkali metalated aromatic compound where three or more aromatic rings, to each to which one or more carbon atoms directly bonded to alkali metal atoms are directly bonded, are bonded through bonding groups.

As the alkali metalated aromatic compound where three or more carbon atoms which are directly bonded to alkali metal atoms are directly bonded to one aromatic ring, a compound which is expressed by the following general formula (1) is preferably used.

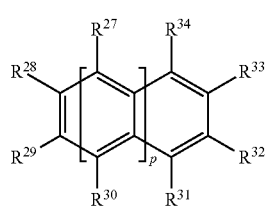

(1)

In the general formula (1), $R^{27}$ to $R^{34}$ respectively independently indicate a hydrogen atom, $C_1$ to $C_{10}$ alkyl groups, or $C_1$ to $C_{10}$ alkali metalated alkyl groups to which an alkali metal atom is bonded at the α-position, while each of three or more of $R^{27}$ to $R^{34}$ is a $C_1$ to $C_{10}$ alkali metalated alkyl group to which an alkali metal atom is bonded at the α-position. Further, "p" is an integer of 0 to 5 and, when "p" is 2 or more, despite the structure which is shown in general formula (1), the three or more present benzene rings may be condensed at any positions with each other. Note that, the above "respectively independently" means that, for example, when "p" is 2 or more, while $R^{27}$ and $R^{30}$ are respectively present in pluralities of numbers, the pluralities of $R^{27}$ or $R^{30}$ may be the same or may be different.

In the general formula (1), "p" is preferably 0, three among $R^{28}$, $R^{29}$, $R^{31}$, $R^{32}$, $R^{33}$, and $R^{34}$ are $C_1$ to $C_{10}$ alkali metalated alkyl groups with alkali metal atoms bonded at the α-positions, and the remaining among $R^{28}$, $R^{29}$, $R^{31}$, $R^{32}$, $R^{33}$, and $R^{34}$ are hydrogen atoms.

Alternatively, the alkali metalated aromatic compound where three or more aromatic rings, to each to which one or more carbon atoms directly bonded to alkali metal atoms are directly bonded, are bonded through a bonding groups, a compound expressed by the following general formula (2) is preferably used.

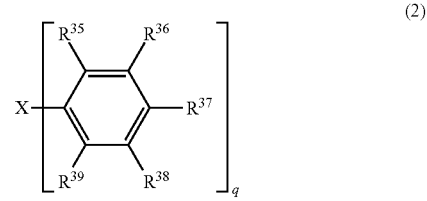

(2)

In the general formula (2), each of $R^{35}$ to $R^{39}$ indicates any atom or group selected from a hydrogen atom, $C_1$ to $C_{10}$ alkyl groups, and $C_1$ to $C_{10}$ alkali metalated alkyl groups to which an alkali metal atom is bonded at the α-position, while each of one or more of $R^{35}$ to $R^{39}$ is a $C_1$ to $C_{10}$ alkali metalated alkyl group to which an alkali metal atom is bonded at the α-position. Further, X indicates any bonding group, while "q" is an integer of 3 to 100. Note that, the above "respectively independently" means that, for example, when "q" is 2 or more, while $R^{35}$ to $R^{39}$ are respectively present in pluralities of numbers, the pluralities of $R^{35}$, $R^{36}$, $R^{37}$, $R^{38}$, or $R^{39}$ may be the same or may be different.

In the present invention, the method of synthesis of the alkali metalated aromatic compound used as the polymerization initiator is not particularly limited, but an alkali metalated aromatic compound which is obtained by making an aromatic compound which has three or more carbon atoms which are directly bonded to aromatic rings in one molecule react with an organic alkali metal compound is preferably used.

The organic alkali metal compound which is used for synthesizing the alkali metalated aromatic compound used in the present invention is not particularly limited, but an alkali metal compound which has an alkyl group or aryl group is preferably used. As specific examples, methyl lithium, methyl sodium, methyl potassium, ethyl lithium, ethyl sodium, ethyl potassium, n-propyl lithium, isopropyl potassium, n-butyl lithium, s-butyl lithium, t-butyl lithium, n-butyl sodium, n-butyl potassium, n-pentyl lithium, n-amyl lithium, n-octyl lithium, phenyl lithium, naphthyl lithium, phenyl sodium, or naphthyl sodium may be mentioned.

Among these, an alkali metal compound which has an alkyl group is preferable, a lithium compound which has an alkyl group is more preferable, and n-butyllithium is particularly preferable.

To synthesize the alkali metalated aromatic compound used in the present invention, when using an alkyl (or aryl) potassium or an alkyl (or aryl) sodium, a lithium compound which has an alkyl group or aryl group and a potassium or sodium compound having an alkoxy group may be mixed to obtain the targeted potassium or sodium compound. As the potassium or sodium compound having an alkoxy group which is used at this time, t-butoxy potassium or t-butoxy sodium may be illustrated. The amount of use of the potassium or sodium compound having an alkoxy group is not particularly limited, but is usually 0.1 to 5.0 mol, preferably 0.2 to 3.0 mol, more preferably 0.3 to 2.0 mol with respect to the lithium compound which has an alkyl group or aryl group.

As the aromatic compound which has three or more carbon atoms which are directly bonded to aromatic rings in one molecule which can be used for synthesis of the alkali metalated aromatic compound, an aromatic compound which is expressed by the following general formula (3), which can be used to obtain an alkali metalated aromatic compound which is expressed by the above-mentioned general formula (1) or an aromatic compound which is expressed by the following general formula (4), which can be used to obtain an alkali metalated aromatic compound which is expressed by the above-mentioned general formula (2) may be mentioned.

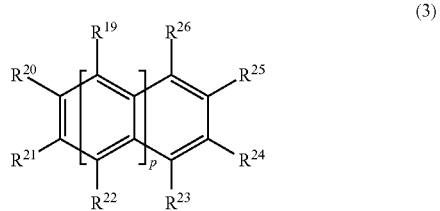

(3)

In the general formula (3), $R^{19}$ to $R^{26}$ respectively independently indicate a hydrogen atom or $C_1$ to $C_{10}$ alkyl groups, while each of three or more of $R^{19}$ to $R^{26}$ is $C_1$ to $C_{10}$ alkyl groups. Further, "p" is an integer of 0 to 5, when "p" is 2 or more, despite the structure of the above general formula (3), the three or more present benzene rings may be condensed at any positions with respect to each other. Note that, the above "respectively independently" means that, for example, when "p" is 2 or more, while $R^{19}$ are $R^{22}$ are respectively present in pluralities of numbers, the pluralities of $R^{19}$ or $R^{22}$ may be the same or may be different.

In the general formula (3), preferably "p" is 0, three among $R^{20}$, $R^{21}$, $R^{23}$, $R^{24}$, $R^{25}$, and $R^{26}$ are $C_1$ to $C_{10}$ alkyl groups, and the remaining among $R^{20}$, $R^{21}$, $R^{23}$, $R^{24}$, $R^{25}$, and $R^{26}$ are hydrogen atoms.

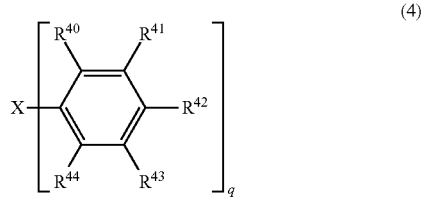

(4)

In the general formula (4), $R^{40}$ to $R^{44}$ respectively independently indicate a hydrogen atom or $C_1$ to $C_{10}$ alkyl group, while one or more of $R^{40}$ to $R^{44}$ is a $C_1$ to $C_{10}$ alkyl group. Further, X indicates any bonding group, while "q" is an integer of 3 to 100. Note that, the above "respectively independently" means that, for example, when "q" is 2 or more, while $R^{40}$ to $R^{44}$ are respectively present in pluralities of numbers, the pluralities of $R^{40}$, $R^{41}$, $R^{42}$, $R^{43}$, or $R^{44}$ may be the same or may be different.

As specific examples of the aromatic compound of general formula (3), 1,2,3-trimethylbenzene, 1,2,4-trimethylbenzene, 1,3,5-trimethylbenzene, hexamethylbenzene, 1,2,3-triethylbenzene, 1,2,4-triethylbenzene, 1,3,5-triethylbenzene, 1,2,3-tripropylbenzene, 1,2,4-tripropylbenzene, 1,3,5-tripropylbenzene, 1,3,5-tributylbenzene, 1,3,5-tripentylbenzene, or other benzenes which have three or more alkyl groups; 2,3,5-trimethylnaphthalene, 1,4,5-trimethylnaphthalene, and other naphthalenes which have three or more alkyl groups; etc. may be mentioned.

Further, as specific examples of the aromatic compound of the above general formula (4), o-methylstyrene oligomer, m-methylstyrene oligomer, p-methylstyrene oligomer, p-ethylstyrene oligomer, p-propylstyrene oligomer, p-butylstyrene oligomer, p-pentylstyrene oligomer, or other polymer of styrene where at least one hydrogen on the benzene ring is substituted with an alkyl group etc. may be mentioned.

In the present invention, as the alkali metalated aromatic compound which is used as a polymerization initiator, from the viewpoint of the obtained conjugated diene-based rubber having a radial structure, one which is obtained by reacting an organic alkali metal compound with an aromatic compound which has three or more carbon atoms which are directly bonded to aromatic rings in one molecule is preferable. From the viewpoint of ease of the obtained conjugated diene-based rubber becoming a radial structure, one which is obtained by reacting an organic alkali metal compound with an aromatic compound of the above general formula (3) is particularly preferable. Therefore, in the present invention, it is preferable to use a polymerization initiator where three or more carbon atoms which are directly bonded to alkali metal atoms are directly bonded to one aromatic ring, in particular a compound of the above general formula (1), as a polymerization initiator. Note that, these alkali metalated aromatic compounds may be used as single type alone or may be used as two types or more combined.

The method of causing the aromatic compound which has three or more carbon atoms which are directly bonded to aromatic rings in one molecule to react with an organic alkali metal compound is not particularly limited, but the method of causing a reaction under an inert atmosphere in an inert solvent is preferably used. The inert solvent which is used is not particularly limited so long as a solvent which can dissolve the compound which is reacted, but use of a hydrocarbon-based solvent is preferable. Specifically, an aliphatic hydrocarbon such as n-hexane, n-heptane, and n-octane; an alicyclic hydrocarbon such as cyclohexane, cyclopentane, and methylcyclohexane; etc. may be mentioned. Note that, these solvents may be used either alone or as a mixture of two or more thereof. Further, the amount of use of the organic alkali metal compound with respect to the aromatic compound which has three or more carbon atoms which are directly bonded to aromatic rings in one molecule is not particularly limited, but is usually 0.1 to 100 mol with respect to 1 mol of the carbon atoms which are directly bonded to the aromatic rings in the aromatic compound, preferably 0.2 to 50 mol, more preferably 0.3 to 10 mol, most preferably 0.3 to 1.1 mol. The reaction time and the reaction temperature of this reaction are not particularly limited, but the reaction time is usually 1 minute to 10 days, preferably 1 minute to 5 days in range, while the reaction temperature is usually −50° C. to 100° C. in range.

Further, in causing the aromatic compound which has three or more carbon atoms which are directly bonded to aromatic rings in one molecule to react with the organic alkali metal compound, to promote the reaction, it is also possible to establish the copresence of a compound which has a coordinating ability on alkali metal atoms. As the compound which has a coordinating ability on alkali metal atoms, a Lewis base compound which contains a hetero atom is preferably used. Among these, a Lewis base compound which contains a nitrogen atom or oxygen atom is particularly preferably used. As specific examples of a Lewis base compound which contains a nitrogen atom or oxygen atom, a chain ether compound such as diethyl ether, anisole, diphenyl ether, dimethoxybenzene, dimethoxyethane, diglyme, and ethyleneglycol dibutyl ether; a tertiary amine compound which has one nitrogen atom in the molecule such as trimethylamine, and triethylamine; a cyclic ether compound having one oxygen atom in the molecule such as tetrahydrofuran, and tetrahydropyrane; a nitrogen-containing heterocyclic compound such as pyridine, lutidine, and 1-methylimidazole; a cyclic ether compound which has two or more oxygen atoms in the molecule such as bistetrahydrofuryl propane; a tertiary amine compound which has two or more nitrogen atoms in the molecule such as N,N,N',N'-tetramethylethylenediamine, dipiperidinoethane, 1,4-diazabicyclo[2.2.2]octane, (−)-sparteine, and N,N,N',N",N"-pentamethyldiethylene-triamine; a tertiary amide compound which has a nitrogen-hetero atom bond in the molecule such as hexamethylphosphoamide; etc. may be mentioned.

The amount of use of the compound which has a coordinating ability on alkali metal atoms is not particularly limited, but should be determined in accordance with the strength of the coordinating ability. For example, when using as the compound which has a coordinating ability on alkali metal atoms a compound with a relatively weak coordinating ability such as a chain ether compound or a tertiary amine compound which has one nitrogen atom in the molecule, the amount of use is usually 1 to 100 mol with respect to 1 mol of the alkali metal atoms in the organic alkali metal compound made to react with the aromatic compound, preferably 5 to 50 mol, more preferably 10 to 25 mol in range. Further, when using as the compound which has a coordinating ability on alkali metal atoms a compound with a medium extent of coordinating ability such as a cyclic ether compound having one oxygen atom in the molecule or a nitrogen-containing heterocyclic compound, the amount of use is usually 1 to 100 mol with respect to 1 mol of the alkali metal atoms in the organic alkali metal compound made to react with the aromatic compound, preferably 1 to 20 mol, more preferably 2 to 10 mol in range. Further, when using as the compound which has a coordinating ability on alkali metal atoms a compound with a relatively strong coordinating ability such as a cyclic ether compound which has two or more oxygen atom in the molecule or a tertiary amine compound which has two or more nitrogen atoms in the molecule, or a tertiary amide compound which has a nitrogen-hetero atom bond in the molecule, the amount of use is usually 0.01 to 5 mol with respect to 1 mol of the alkali metal atoms in the organic alkali metal compound made to react with the aromatic compound, preferably 0.01 to 2 mol, more preferably 0.01 to 1.5 mol in range. If the amount of use of a compound which has a coordinating ability on alkali metal atoms is too great, the reaction is liable to no longer proceed. Note that, these compounds which have a coordinating ability to the alkali metal atoms may be used as single type alone or may be used as two types or more combined.

From the viewpoint of making the production efficiency of the alkali metalated aromatic compound which has three or more carbon atoms which are directly bonded to alkali metal atoms and aromatic rings in one molecule particularly good and raising the ratio of the radial polymer in the conjugated diene-based rubber, as the compound which has a coordinating ability on alkali metal atoms, it is preferable to use at least one compound selected from a cyclic ether compound which has two or more oxygen atoms in the molecule, a tertiary amine compound which has two or more nitrogen atoms in the molecule, and a tertiary amide compound which has a nitrogen-hetero atom bond in the molecule and to make the amount of use 0.02 to 0.4 mol in range with respect to 1 mol of alkali metal atoms in the organic alkali metal compound which is made to react with the aromatic compound.

In causing an aromatic compound to react with an organic alkali metal compound, when establishing copresence of a compound which has a coordinating ability on alkali metal atoms, the sequence of addition is not particularly limited. However, from the viewpoint of making the production efficiency of the alkali metalated aromatic compound particularly good, the sequence of establishing the copresence of an aromatic compound and organic alkali metal compound, then adding to the system the compound which has a coordinating ability on alkali metal atoms or the sequence of establishing the copresence of an aromatic compound and a compound which has a coordinating ability on alkali metal atoms, then adding to the system an organic alkali metal compound is suitable. By adding the ingredients in such a sequence, insolubility due to the organic alkali metal compound and the compound which has a coordinating ability on alkali metal atoms forming a complex is prevented and the production efficiency of the alkali metalated aromatic compound becomes particularly good.

At the first step of the method of production of the present invention, for example, the above obtained alkali metalated aromatic compound which has three or more carbon atoms which are directly bonded to alkali metal atoms and aromatic rings in one molecule is used as a polymerization initiator to polymerize a monomer which contains at least a conjugated diene compound to thereby obtain a conjugated diene-based rubber which has active ends. The conjugated diene compound is not particularly limited. For example, 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, 1,3-cyclohexadiene, etc. may be mentioned. Among these as well, 1,3-butadiene, isoprene, and 1,3-pentadiene are preferable, while 1,3-butadiene and isoprene are particularly preferable. Note that, these conjugated diene compounds may be used as single type alone or may be used as two types or more combined.

Further, in the method of production of the present invention, the conjugated diene-based rubber which has active ends preferably is one which is obtained by copolymerizing a monomer which contains an aromatic vinyl compound in addition to a conjugated diene compound. The aromatic vinyl compound is not particularly limited. For example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene etc. may be mentioned. Among these as well, styrene, α-methylstyrene, and 4-methylstyrene are preferable while styrene is particularly preferable. Note that, these aromatic vinyl compounds may be used as single type alone or may be used as two types or more combined. The conjugated diene-based rubber which has active ends which is used in the present invention one which contains conjugated diene monomer units in 50 to 100 wt % is preferable, one which contains these in 55 to 95 wt % is particularly preferable, one which contains aromatic vinyl monomer units in 50 to 0 wt % is preferable, one which contains these in 45 to 5 wt % is particularly preferable.

Further, in the method of production of the present invention, the conjugated diene-based rubber which has active ends may, to an extent not detracting from the object of the present invention, if desired, be one which is polymerized with a monomer which contains other monomers in addition to a conjugated diene compound and aromatic vinyl compound. As the other monomers, for example, α,β-unsaturated nitrile such as acrylonitrile, and methacrylonitrile; unsaturated carboxylic acid or acid anhydride such as acrylic acid, methacrylic acid, and maleate anhydride; unsaturated carboxylic acid ester such as methyl methacrylate, ethyl acrylate, and butyl acrylate; unconjugated diene such as 1,5-hexadiene, 1,6-heptadiene, 1,7-octadiene, dicyclopentadiene, 5-ethylidene-2-norbornene; etc. may be mentioned. These monomers preferably are made, as monomer units, 10 wt % or less in the conjugated diene-based rubber which has active ends, more preferably 5 wt % or less.

In the method of production of the present invention, the form of the copolymerization when using at least two types of monomers to obtain a copolymer is not particularly limited. It may be a random type, block type, taper type, etc., but a random type of bonding is preferable. By making it a random type, the obtained rubber cross-linked product becomes excellent in low heat buildup.

In the method of production of the present invention, usually, the polymerization reaction proceeds along with the living property, so the ratio of use of the alkali metalated aromatic compound which is used as the polymerization initiator and the monomer should be determined in accordance with the molecular weight of the targeted polymer, but the amount of the alkali metal in the alkali metalated aromatic compound is usually selected in the range of 0.000001 to 0.1 mol with respect to 1 mol of the monomer, preferably 0.00001 to 0.05 mol, particularly preferably 0.0001 to 0.01 mol. If the amount of use of the alkali metalated aromatic compound is too small, the obtained conjugated diene-based rubber becomes too high in molecular weight and the handling becomes difficult or the polymerization reaction is liable not to sufficiently proceed. On the other hand, if the amount of use of the alkali metalated aromatic compound is too large, the obtained conjugated diene-based rubber becomes too low in molecular weight and the characteristics as a rubber material are liable to become inferior.

Further, in performing the polymerization reaction, to control the polymerization speed and the microstructure of the obtained conjugated diene-based rubber, it is also possible to add the above compound which has a coordinating ability on alkali metal atoms to the polymerization reaction system. The amount of use of these compounds which have a coordinating ability on alkali metal atoms is usually 5 mol or less with respect to 1 mol of the alkali metal atoms in the alkali metalated aromatic compound which is used as the polymerization initiator, preferably 4 mol or less, more preferably 2 mol or less in range. If the amount of use of these compounds which have a coordinating ability on alkali metal atoms is too great, the polymerization reaction is liable to be impaired. Note that, in preparing the alkali metalated aromatic compound to be used as the polymerization initiator, when using a compound which has a coordinating ability on alkali metal atoms, it is also possible to use as is a solution which contains that compound.

In particular, from the viewpoint of being able to make the obtained rubber cross-linked product one which is excellent in low heat buildup, it is preferable to establish the presence of at least one compound selected from a cyclic ether compound which has two or more oxygen atoms in the molecule, a tertiary amine compound which has two or more nitrogen atoms in the molecule, and a tertiary amide compound which has a nitrogen-hetero atom bond in the molecule in 0.02 to 3.0 mol in range with respect to 1 mol of the alkali metal atoms in the alkali metal compound used as a polymerization initiator (the "alkali metal compound" referred to here not being limited to an alkali metalated aromatic compound and including all alkali metal compounds present in the reaction system and acting as a polymerization initiator). By doing this, a conjugated diene-based rubber which has a suitable vinyl bond content is obtained and as a result the rubber cross-linked product which is obtained using this can be made excellent in low heat buildup.

The polymerization system of the monomer which contains the conjugated diene compound in the method of production of the present invention is preferably the solution polymerization method.

The solvent which is used in the solution polymerization method is not particularly limited so long as being a solvent which is inert in the polymerization reaction and able to dissolve the monomer and polymerization catalyst, but use of a hydrocarbon-based solvent is preferable. Specifically, for example, an aromatic hydrocarbon such as benzene, toluene, xylene, and ethylbenzene; an aliphatic hydrocarbon such as n-hexane, n-heptane, and n-octane; an alicyclic hydrocarbon such as cyclohexane, cyclopentane, and methylcyclohexane; an ether such as tetrahydrofuran, diethyl ether, and cyclopentylmethyl ether, etc. may be mentioned. Among these, aliphatic hydrocarbons or alicyclic hydrocarbons are preferable since the polymerization activity becomes higher if they are used as solvents. Note that, these solvents may be used either alone or as a mixture of two or more thereof.

The concentration of the monomer in the polymerization solution is not particularly limited, but usually is selected in the range of 1 to 50 wt %, preferably 2 to 45 wt %, more preferably 5 to 40 wt %. If the concentration of the monomer in the solution is too low, the productivity of the radial conjugated diene-based rubber is liable to deteriorate, while if the concentration is too high, the viscosity of the solution sometimes becomes too high and the handling becomes difficult. Further, the polymerization temperature is also not particularly limited, but is usually −30° C. to 200° C., preferably 0° C. to 180° C. in range. The polymerization time is also not particularly limited. It is usually 1 minutes to 100 hours in range. As the polymerization system, the batch system, continuous system, or other system can be employed, but when copolymerizing a conjugated diene compound and an aromatic vinyl compound, the batch system is preferable in the point of easy control of the random nature of bonding between the conjugated diene monomer units and aromatic vinyl monomer units.

By polymerizing a monomer which contains a conjugated diene compound in the above way, it is possible to obtain a conjugated diene-based rubber. Note that, in the method of production of the present invention, usually the polymerization reaction proceeds along with a living ability, the polymerization reaction system has a polymer which has active ends. For this reason, at the first step, the conjugated diene-based rubber which is obtained by a polymerization reaction has active ends. As opposed to this, in the method of production of the present invention, in the later explained second step, a modified conjugated diene-based rubber is obtained by making the compound of the later explained general formula (5) react with the active ends of the conjugated diene-based rubber which is obtained by the polymerization reaction. In particular, in the method of production of the present invention, the conjugated diene-based rubber which has active ends obtained in the first step has a radial structure, so compared with a linear conjugated diene-based rubber where only one side of the polymer chain is an active ends, there are a large number of active ends in one molecule, efficient modification is possible, and as result affinity with silica is improved more. Further, since having a radial structure, it is possible to obtain a multibranched structure even without using a coupling agent.

Below, the second step in the method of production of the present invention will be explained.

<Second Step>

In the method of production of the present invention, the second step is a step of making a compound of the following general formula (5) react with the active ends of the conjugated diene-based rubber which is obtained at the above-mentioned first step so as to obtain a modified conjugated diene-based rubber.

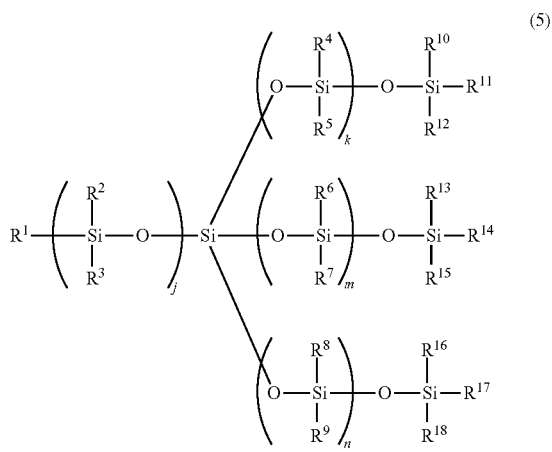

(5)

In the above general formula (5), any of $R^1$ and $R^{10}$ to $R^{18}$ is an atom or reactive group which can react with the active ends of the conjugated diene-based rubber or a hydrocarbon group which contains one of either the atom or the reactive group, and the remaining among $R^1$ and $R^{10}$ to $R^{18}$ are respectively independently a hydrogen atom, $C_1$ to $C_{10}$ alkyl group, or $C_6$ to $C_{12}$ aryl group. $R^2$ to $R^9$ are respectively independently a hydrogen atom, $C_1$ to $C_{10}$ alkyl group, or $C_6$ to $C_{12}$ aryl group. "j", "k", "m", and "n" respectively independently are integers of 0 to 100. Note that, the above "$R^2$ to $R^9$ are respectively independently", for example, means that when "j", "k", "m", and "n" are respectively 2 or more, while $R^2$ to $R^9$ are respectively present in pluralities of numbers, the pluralities of $R^2$, $R^3$, $R^4$, $R^5$, $R^6$, $R^7$, $R^8$, or $R^9$ may be the same or may be different.

In the method of production of the present invention, by reacting a compound of the general formula (5) with the active ends of the conjugated diene-based rubber, it is possible to modify the conjugated diene-based rubber and improve the affinity with filler such as silica and possible to make the obtained modified conjugated diene-based rubber one which is excellent in processability and further gives a rubber cross-linked product which is provided with low heat buildup and abrasion resistance.

In the above general formula (5), the atom or reactive group which can be reacted with the active ends of the conjugated diene-based rubber is not particularly limited. One which can react with the active ends is sufficient, but from the viewpoint of the reactivity with the active ends, a halogen atom, vinyl group, alkoxyl group, amino group, or epoxy group is preferable, an epoxy group, or halogen atom is more preferable, a halogen atom is furthermore preferable, and a chlorine atom is particularly preferable.

In the above general formula (5), the hydrocarbon group which contains one of either the atom or the reactive group is not particularly limited, but a $C_1$ to $C_{10}$ hydrocarbon group is preferable. Note that, for the number of the carbons, the number of carbon atoms which form the reactive group is not included.

Further, in the above general formula (5), any of $R^1$ and $R^{10}$ to $R^{18}$ may be an atom or reactive group which can react with the active ends of the conjugated diene-based rubber or a hydrocarbon group which includes one of either the atom or the reactive group, but in the present invention, $R^1$ is preferably an atom or reactive group which can react with the active ends of the conjugated diene-based rubber or a hydrocarbon group which includes one of either the atom or the reactive group, and the remaining $R^{10}$ to $R^{18}$ are preferably a hydrogen atom, $C_1$ to $C_{10}$ alkyl group, or $C_6$ to $C_{12}$ aryl group. Further, as $R^{10}$ to $R^{18}$, a $C_1$ to $C_{10}$ alkyl group is more preferable, a $C_1$ to $C_5$ alkyl group is furthermore preferable, and a methyl group is particularly preferable.

Further, in the above general formula (5), "j", "k", "m", and "n" are respectively independently integers of 0 to 100. From the viewpoint of enabling the action and effect of the present invention to be further improved, "j", "k", "m", and "n" are preferably integers of 0 to 10, while "j", "k", "m", and "n" are particularly preferably all 0.

In the method of production of the present invention, in particular, a compound where, in the above general formula (5), $R^1$ is chlorine, $R^{10}$ to $R^{18}$ are all methyl groups, and "j", "k", "m", and "n" are all 0 can be suitably used.

The amount of use of the compound of the general formula (5) is not particularly limited, but the amount of the atoms or reactive groups which can be reacted with the active ends of the conjugated diene-based rubber per 1 mol of alkali metal atoms in the alkali metalated aromatic compound which is used as the polymerization initiator preferably is made 0.05 to 5 moles in range, more preferably an amount giving 0.1 to 3 moles, particularly preferably an amount giving 0.5 to 1.5 moles. By making the amount of use of the compound of the general formula (5) in the above range, it is possible to make the effect of addition more remarkable. Note that, the compound of the above general formula (5) may be used as single type alone or as may be used as two types or more combined.

At the second step of the method of production of the present invention, the method of reacting the compound of the general formula (5) with the active ends of the conjugated diene-based rubber which was obtained at the above first step is not particularly limited, but the method of mixing the conjugated diene-based rubber which has active ends which is obtained at the first step and the compound of the general formula (5) in a solvent which can dissolve the same etc. may be mentioned. As the solvent which is used at this time, one which is illustrated as a solvent which is used for polymerization of a conjugated diene-based rubber can be used. Further, at this time, the method of making the conjugated diene-based rubber which has active ends which is obtained at the above first step the state of the polymerization solution which is used for that polymerization as it is and adding the compound of the above general formula (5) to that is simple and preferable. In the second step, the reaction temperature is not particularly limited, but is usually 0 to 120° C., while the reaction time is not particularly limited, but usually is 1 minute to 1 hour.

When the conjugated diene-based rubber which has active ends has unreacted active ends remaining in it after reaction with the compound of the general formula (5), an alcohol such as methanol, ethanol, and isopropanol or water or other polymerization terminator is preferably added to the polymerization solution to deactivate the unreacted polymerization ends.

To the solution of the conjugated diene-based rubber obtained in the above way, it is possible to add, as desired, an antioxidant such as a phenol-based stabilizer, phosphorus-based stabilizer, and sulfur-based stabilizer. The amount of the antioxidant added may be suitably determined in accordance with the type etc. Furthermore, if desired, an extension oil may also be blended in to obtain oil-extended rubber. As the extension oil, for example, a petroleum-based softening agent such as paraffin-based, aromatic-based, and naphthalene-based, plant-based softening agent, and fatty acid, etc. may be mentioned. When using a petroleum-based softening agent, the content of polycyclic aromatic which is extracted by the method of IP346 (method of testing of the Institute Petroleum of the UK) is preferably less than 3%. When using the extension oil, the amount of use is usually 5 to 100 parts by weight with respect to 100 parts by weight of the modified conjugated diene-based rubber. Further, the modified conjugated diene-based rubber after the modification reaction is separated and obtained from the reaction mixture by, for example, reprecipitation, removal of the solvent under heating, removal of the solvent under vacuo, removal of solvent by steam (steam stripping), or other normal operation for separating rubber from a solution.

According to the method of production of the present invention, when polymerizing the conjugated diene compound in the first step, as a polymerization initiator, an alkali metalated aromatic compound which has three or more carbon atoms which are directly bonded to alkali metal atoms and aromatic rings in one molecule is used, so the conjugated diene polymer chain grows along with the living polymerizing ability using the three or more carbon atoms to which alkali metal atoms are directly bonded which are contained in the alkali metalated aromatic compound as polymerization starting points, therefore it is possible to make the obtained conjugated diene-based rubber have a radial structure. Further, in the present invention, in the second step, the compound of the general formula (5) is reacted with the active ends of the conjugated diene-based rubber which has such a radial structure, a modified conjugated diene-based rubber which has a radial structure and which is modified by a compound of the general formula (5) is obtained.

Further, the modified conjugated diene-based rubber of the present invention which is obtained in this way has a radial structure, so is improved in affinity with a filler etc. Further, by using as the modifier for modifying the active ends, the compound of the above general formula (5), it is possible to effectively prevent the occurrence of gelation (3D cross-linking) of the conjugated diene-based rubber at the time of a modification reaction and as a result possible to improve the processability. In addition, the modified conjugated diene-based rubber of the present invention is modified at its active ends by a compound of the above general formula (5), so it is possible to remarkably improve the affinity with the filler etc. by a modification action by the compound of the general formula (5). Due to this, it is possible to further improve the low heat buildup and abrasion resistance when blended in the filler such as silica and made into a rubber cross-linked product.

Note that, in the modified conjugated diene-based rubber which is obtained by the method of production of the present invention, the ratio of the radial conjugated diene-based rubber (that is, conjugated diene-based rubber with three or more branches) is not particularly limited, but is usually 10 to 100 wt %, preferably, 20 to 100 wt %. By including this radial conjugated diene-based rubber in such a ratio, it is possible to further improve the processability of the modified conjugated diene-based rubber and possible to further improve the affinity with the filler such as silica etc.

The weight average molecular weight of the modified conjugated diene-based rubber which is obtained by the method of production of the present invention is not particularly limited, but is a value which is measured by gel permeation chromatography converted to polystyrene of usually 1,000 to 3,000,000, preferably 10,000 to 2,000,000, more preferably 100,000 to 1,500,000 in range. By making the weight average molecular weight of the modified conjugated diene-based rubber in the above range, it becomes easy to blend the silica in the modified conjugated diene-based rubber and the rubber composition becomes excellent in processability.

Further, the molecular weight distribution, which is expressed by the ratio (Mw/Mn) of the weight average molecular weight (Mw) and the number average molecular weight (Mn), of the modified conjugated diene-based rubber which is obtained by the method of production of the present invention is not particularly limited, but is preferably 1.1 to 5.0, particularly preferably 1.2 to 3.0. By making the molecular weight distribution of the modified conjugated diene-based rubber in the above range, the obtained rubber cross-linked product becomes excellent in low heat buildup.

Further, the Mooney viscosity ($ML_{1+4}$, 100° C.) of the modified conjugated diene-based rubber which is obtained by the method of production of the present invention is not particularly limited, but is usually 20 to 150, preferably 30 to 120 in range. By making the Mooney viscosity of the modified conjugated diene-based rubber in the above range, the processability of the rubber composition becomes excellent. Note that, when making the modified conjugated diene-based rubber an oil-extended rubber, the Mooney viscosity of the oil-extended rubber is preferably made in the above range.

Further, the content of vinyl bonds in the conjugated diene unit part of the modified conjugated diene-based rubber which is obtained by the method of production of the present invention is usually 1 to 80 mol %, preferably 5 to 75 mol %. By making the amount of vinyl bonds in the above range, the obtained rubber cross-linked product becomes excellent in low heat buildup.

<Rubber Composition>

The rubber composition of the present invention is a composition which contains silica in 10 to 200 parts by weight with respect to 100 parts by weight of the rubber ingredient which contains the modified conjugated diene-based rubber which is obtained by the above-mentioned method of production of the present invention.

As the silica used in the present invention, for example, dry-process white carbon, wet-process white carbon, colloidal silica, precipitated silica, etc. may be mentioned. Among these, wet-process white carbon mainly comprised of hydrous silicic acid is preferably used. Further, it is also possible to use a carbon-silica dual phase filler comprised of carbon black on the surface of which silica is carried. These silica may be used either alone or as a combination of two or more thereof. The nitrogen adsorption specific surface area of the silica used (measured in accordance with ASTM D3037-81 by BET method) is preferably 50 to 300 $m^2/g$, more preferably 80 to 220 $m^2/g$, particularly preferably 100 to 170 $m^2/g$. Further, the pH of the silica is preferably 5 to 10.

The amount of silica in the rubber composition of the present invention is 10 to 200 parts by weight with respect to 100 parts by weight of the rubber ingredient in the rubber composition, preferably 30 to 150 parts by weight, more preferably 50 to 100 parts by weight. By making the amount of silica in the above range, the processability of the rubber composition becomes excellent and the obtained rubber cross-linked product becomes excellent in abrasion resistance and low heat buildup.

The rubber composition of the present invention may further contain a silane coupling agent from the viewpoint of further improving the low heat buildup. As the silane coupling agent, for example, vinyl triethoxysilane, β-(3,4-epoxycyclohexyl)ethyl trimethoxysilane, N-(β-aminoethyl)-γ-aminopropyl trimethoxysilane, 3-octathio-1-propyl-triethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, γ-trimethoxysilylpropylbenzothiazyl tetrasulfide, etc. may be mentioned. These silane coupling agents may be used respectively alone or as two types or more combined. The amount of the silane coupling agent is preferably 0.1 to 30 parts by weight with respect to 100 parts by weight of silica, more preferably 1 to 15 parts by weight.

Further, the rubber composition of the present invention may further contain carbon black such as furnace black, acetylene black, thermal black, channel black, and graphite. Among these as well, furnace black is preferable. These carbon black may be used respectively alone or as two types or more combined. The amount of carbon black is usually 120 parts by weight or less with respect to 100 parts by weight of the rubber ingredient in the rubber composition.

Note that, the method of adding silica to the rubber ingredient which contains the modified conjugated diene-based rubber of the present invention is not particularly limited. The method of adding it and kneading it to a solid rubber ingredient (dry kneading method), the method of adding it to a solution which contains modified conjugated diene-based rubber then coagulation and drying the same (wet kneading method) etc. may be used.

Further, the rubber composition of the present invention preferably further contains a cross-linking agent. As a cross-linking agent, for example, sulfur-containing compound such as sulfur, and halogenated sulfur, organic peroxide, quinone dioximes, organic polyamine compound, alkylphenol resin which contains methylol groups; etc. may be mentioned. Among these as well, sulfur is preferably used. The amount of cross-linking agent is preferably 0.1 to 15 parts by weight with respect to 100 parts by weight of rubber ingredient in the rubber composition, more preferably 0.5 to 5 parts by weight, particularly preferably 1 to 4 parts by weight.

Furthermore, the rubber composition of the present invention may contain, in addition to the above ingredients, in accordance with an ordinary method, a cross-linking accelerator, cross-linking activator, antioxidant, filler (excluding the above silica and carbon black), activator, process oil, plasticizer, lubricant, tackifier, or the compounding agent in the necessary amounts.

When using, a cross-linking agent, sulfur or sulfur-containing compound, a cross-linking accelerator and a cross-linking activator are preferably jointly used. As the cross-linking accelerator, for example, a sulfenamide-based cross-linking accelerator; guanidine-based cross-linking accelerator; thiurea-based cross-linking accelerator; thiazole-based cross-linking accelerator; thiuram-based cross-linking accelerator; dithiocarbamic acid-based cross-linking accelerator; xantogenic acid-based cross-linking accelerator; etc. may be mentioned. Among these as well, one containing a sulfenamide-based cross-linking accelerator is preferable. These cross-linking accelerators may be used respectively alone or as two types or more combined. The amount of cross-linking accelerator is preferably 0.1 to 15 parts by weight with respect to 100 parts by weight of the rubber ingredient in the rubber composition, more preferably 0.5 to 5 parts by weight, particularly preferably 1 to 4 parts by weight.

As the cross-linking activator, for example, higher fatty acid such as stearic acid; zinc oxide; etc. may be mentioned. These cross-linking activators may be used respectively alone or as two types or more in combination. The amount of cross-linking activator is preferably 0.05 to 20 parts by weight with respect to 100 parts by weight of the rubber ingredient, particularly preferably 0.5 to 15 parts by weight.

Further, the rubber composition of the present invention may contain other rubber other than the modified conjugated diene-based rubber which is obtained by the above-mentioned method of production of the present invention. As the other rubber, for example, natural rubber, polyisoprene rubber, emulsion polymerized styrene-butadiene copolymer rubber, solution polymerized styrene-butadiene copolymer rubber, polybutadiene rubber (may also be polybutadiene rubber containing crystal fibers made of 1,2-polybutadiene polymer), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber may be mentioned. Among these in particular, natural rubber, polyisoprene rubber, polybutadiene rubber, or solution polymerized styrene-butadiene copolymer rubber is preferably used. These rubber may be used respectively alone or as two types or more in combination.

In the rubber composition of the present invention, the modified conjugated diene-based rubber which is obtained by the method of production of the present invention preferably accounts for 10 to 100 wt % of the rubber ingredient in the rubber composition, particularly preferably 40 to 100 wt %. By including the modified conjugated diene-based rubber which is obtained by the method of production of the present invention in the rubber ingredient in such a ratio, it is possible to obtain a rubber cross-linked product which is excellent in low heat buildup and abrasion resistance.

To obtain the polymer composition of the present invention, the components may be kneaded in accordance with an ordinary method. For example, the compounding ingredients other than the cross-linking agent, cross-linking accelerator or other ingredients which are unstable against heat and the modified conjugated diene-based rubber are kneaded, then the kneaded matter is mixed with the cross-linking agent, cross-linking accelerator or other ingredients which are unstable against heat to obtain the target composition. The kneading temperature of the compounding agents other than the ingredients which are unstable against heat and he modified conjugated diene-based rubber is preferably 80 to 200° C., more preferably 120 to 180° C. and the kneading time of that is preferably 30 seconds to 30 minutes. Further, the kneaded matter is mixed with the cross-linking agent and cross-linking accelerators after cooling usually down to 100° C. or less, preferably 80° C. or less.

<Rubber Cross-Linked Product>

The rubber cross-linked product of the present invention is obtained by cross-linking the above-mentioned rubber of the present invention.

The rubber cross-linked product of the present invention can be produced by using the rubber composition of the present invention, for example, molding it by a molding machine which is designed for the desired shape, for example, an extruder, an injection molding machine, a press, a roll, etc., and heating it to cause a cross-linking reaction and fix the shape as a cross-linked product. In this case, it is possible to shape the composition in advance, then cross-link it or shape and cross-link it simultaneously. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the rubber cross-linked product, sometimes even if the surface is cross-linked, the inside may not be sufficiently cross-linked, so the product may be further heated for secondary cross-linking.

As the heating method, press heating, steam heating, oven heating, hot air heating, or other general method which is used for cross-linking rubber may be suitably selected.

The thus obtained rubber cross-linked product of the present invention is obtained by using the modified conjugated diene-based rubber which is obtained by the above-mentioned method of production of the present invention, so is excellent in low heat buildup and abrasion resistance. In particular, the modified conjugated diene-based rubber which is obtained by the method of production of the present invention is obtained by using, as a modifier, a compound of the above general formula (5), so gelation due to addition of the modifier can be effectively suppressed. For this reason, when mixing silica as a filler in a modified conjugated diene-based rubber, the gel content does not cause a drop in the dispersability of silica. Therefore, the rubber cross-linked product of the present invention which is obtained using the modified conjugated diene-based rubber which is obtained by such a method of production of the present invention has silica as the filler dispersed well in it and as a result is particularly excellent in low heat buildup and abrasion resistance.

Further, the rubber cross-linked product of the present invention, making use of such characteristics, for example, can be used in a tire as a material for tire parts such as captread, base tread, carcass, sidewalls, and bead part; a material for a hose, belt, mat, vibration insulator rubber, or other various industrial parts; an agent for improving the shock resistance of resins; a resin film buffer agent; a shoe sole; rubber shoes; golf balls; toys; and other various types of applications. In particular, the rubber cross-linked product of the present invention is excellent in low heat buildup and abrasion resistance, so it can be suitably used as a material of a tire, in particular a material for a tire for reducing fuel consumption.

EXAMPLES

Below, the present invention was explained based on more detailed examples, but the present invention is not limited to these examples. Note that, below, "%" is based on weight unless otherwise indicated. Further, the tests and evaluations were conducted as follows.

(Molecular Weight of Rubber)

The molecular weight of rubber was measured by gel permeation chromatography as the molecular weight converted to polystyrene. The specific measurement conditions were as follows.

Measuring device: High speed liquid chromatograph (made by Toso, product name "HLC-8220")

Column: Made by Toso, product name "GMH-HR-H", two connected in series.

Detector: Differential inflection meter (made by Toso, product name "RI-8220")

Elution solution: Tetrahydrofuran

Column temperature: 40° C.

(Branching Degree of Rubber)

The branching degree of rubber was measured by a multiangle light scattering meter. The specific measurement conditions were as follows.

Pump: Made by Waters, product name "MODEL 515"

Column: Made by Tosoh, product name "GMH-HR-M", three connected in series.

Detector: Differential refractometer (made by Waters, product name "RI-2414")

Detector: Multiangle light scattering meter (made by Wyatt Technology, product name "DAWN EOS")

Elution solution: Tetrahydrofuran

Column temperature: 23° C.

(Microstructure of Rubber, Modification of Rubber)

Measured by $^1$H-NMR.

Measuring device: (made by JEOL, product name "JNM-ECA-400WB"

Measurement solvent: Deuterochloroform (Lithiation of Initiator)

Measured by GC-MS.

GC: (made by Agilent Technology, product name "Agilent GC 6890NGC")

MS: (made by Agilent Technology, product name "Agilent MS 5973MSD")

Column: (made by Agilent Technology, product name "DB1701")

(Gel Weight Fraction)

A #100 mesh cage was filled with rubber (weight: Wa[g]) cut into 1 mm squares or so. This was stored in toluene at room temperature (25° C.) for 24 hours, then was lifted up. Next, the rubber remaining in the #100 mesh cage was dried in vacuo and measured for weight after drying (Wb[g]). Further, from these weighed values, the gel weight fraction was found by toluene insolubles=(Wb/Wa)×100(%). Note that, the lower the gel weight fraction, the better the processability can be judged.

(Low Heat Buildup)

A test piece of a length of 50 mm, a thickness of 12 mm, and a thickness of 2 mm was measured using a viscoelasticity measurement device (made by GABO, product name "EPTFXOR 500N") for dynamic strain dispersion of the storage elastic modulus of a strain of 0.5 to 2.5% under a condition of a frequency of 1 Hz at 60° C. This characteristic was shown indexed to the measurement value of Comparative Example 1 as 100. The larger this index, the better the low heat buildup.

(Abrasion Resistance)

A test piece of an outside diameter of 50 mm, an inside diameter of 15 mm, and a thickness of 10 mm was measured using an FPS abrasion tester made by Ueshima Seisakusho under a load of 1 kgf and a slip rate of 15%. This characteristic was shown indexed to the measurement value of Comparative Example 1 as 100. The larger this index, the better the abrasion resistance.

Production Example 1

Production of Polymerization Initiator 1 (Lithiation of 1,3,5-Trimethylbenzene)

In a nitrogen atmosphere, a glass reaction vessel was charged with cyclohexane 16 parts, 1,3,5-trimethylbenzene 0.841 part, and tetramethylethylenediamine 0.813 part. Next, while stirring, n-butyllithium 1.345 parts (giving the tetramethylethylenediamine 0.3 mol with respect to 1 mol of n-butyllithium) was added, then the mixture was reacted at a reaction temperature of 60° C. while stirring for 2 days to obtain a solution of the Polymerization Initiator 1 (lithiated 1,3,5-trimethylbenzene) 18.999 parts. Next, for the purpose of measuring the lithiation rate of the lithiated 1,3,5-trimethylbenzene which was obtained by the reaction, a glass vessel to which an excess of trimethylsilyl chloride was added was charged with several drops of the obtained reaction solution and the mixture was reacted for 30 minutes. Tap water was used to extract and wash the catalyst residue, then the solvent was distilled off to obtain a yellow oily liquid.

Further, this yellow oily liquid was measured by gas chromatography mass spectrometry (GC-MS). The results were as follows.

EI-MS, m/z=120 (M+) (2%), m/z=192 (M+) (3%), m/z=264 (M+) (25%), m/z=336 (M+) (70%). Mw=120 (2%), Mw=192 (3%), Mw=264 (25%), Mw=336 (70%).

Next, this yellow oily liquid was measured by $^1$H-NMR. The results were as follows.

$^1$H-NMR (CDCl$_3$) 6.83 (s, 3H, Ph-H), 6.73 (s, 1H, Ph-H), 6.64 (s, 2H, Ph-H), 6.55 (s, 2H, Ph-H), 6.47 (s, 1H, Ph-H), 6.39 (s, 3H, Ph-H), 2.30 (s, 9H, Ph-CH$_3$), 2.28 (s, 6H, Ph-CH$_3$), 2.02 (s, 2H, Ph-CH$_2$—SiMe$_3$), 2.26 (s, 3H, Ph-CH$_3$), 2.00 (s, 4H, Ph-CH$_2$—SiMe$_3$), 1.98 (s, 6H, Ph-CH$_2$—SiMe$_3$).

Furthermore, $^1$H-detected multi-bond heteronuclear multiple quantum coherence spectrum-NMR (HMBC-NMR) measurement was used for attribution of the signals at $^1$H-NMR. The results were as shown below.

Non-substituted compound (1,3,5-trimethylbenzene) $^1$H-NMR (CDCl$_3$):
6.83 (s, 3H, Ph-H), 2.30 (s, 9H, Ph-CH$_3$), 1-substituted compound (1-trimethylsilylmethyl-3,5-dimethylbenzene)
$^1$H-NMR (CDCl$_3$): 6.73 (s, 1H, Ph-H), 6.64 (s, 2H, Ph-H), 2.28 (s, 6H, Ph-CH$_3$),
2.02 (s, 2H, Ph-CH$_2$—SiMe$_3$), 2-substituted compound (1,3-bis(trimethylsilylmethyl)-5-methylbenzene)-NMR (CDCl$_3$):
6.55 (s, 2H, Ph-H), 6.47 (s, 1H, Ph-H), 2.26 (s, 3H, Ph-CH$_3$),
2.00 (s, 4H, Ph-CH$_2$—SiMe$_3$), 3-substituted compound (1,3,5-tris(trimethylsilylmethyl)benzene) $^1$H-NMR (CDCl$_3$): 6.39 (s, 3H, Ph-H),
1.98 (s, 6H, Ph-CH$_2$—SiMe$_3$)

Based on the attribution based on the above $^1$H-NMR, HMBC-NMR measurement, the molecular ion peaks obtained by GC-MS were attributed as follows. EI-MS, m/z=120 (M+) was the non-substituted compound (1,3,5-trimethylbenzene), m/z=192 (M+) was the 1-substituted compound (1-trimethylsilylmethyl-3,5-dimethylbenzene), m/z=264 (M+) was the 2-substituted compound (1,3-bis(trimethylsilylmethyl)-5-methylbenzene), m/z=336 (M+) was the 3-substituted compound (1,3,5-tris(trimethylsilylmethyl)benzene). Due to the above, the ratio of non-substituted compound:1-substituted compound:2-substituted compound:3-substituted compound (molar ratio) was found as 2:3:25:70, the lithiation rate of the methyl group of 1,3,5-trimethylbenzene was 87%, and the average number of lithium atoms which were introduced in one 1,3,5-trimethylbenzene molecule was 2.63.

Example 1

Production of Modified Styrene-Butadiene Rubber 1

In a nitrogen atmosphere, an autoclave was charged with cyclohexane 800 parts, 1,3-butadiene 94.8 parts, styrene 25.2 parts, and tetramethylethylenediamine 0.232 part, then a solution of the Polymerization Initiator 1 which was obtained in Production Example 1 (lithiated 1,3,5-trimethylbenzene) 0.925 part was added (amount of tetramethylethylenediamine present in reaction system of 2.0 mol per 1 mol of n-butyllithium used for lithiation of 1,3,5-trimethylbenzene), then polymerization was initiated at 60° C. The polymerization reaction was continued for 60 minutes. When the polymerization conversion rate was confirmed to become 95% to 100% in range, a modifier constituted by tris(trimethylsiloxy)chlorosilane (in above general formula (5), j, k, m, and n=0, $R^1$=Cl, $R^{10}$ to $R^{18}$=CH$_3$) 0.265 part (amount giving 1.0 mol with respect to 1 mol of Li contained in Polymerization Initiator 1) was added, the mixture was reacted for 30 minutes, then a polymerization terminator constituted by methanol 0.064 part was added to obtain a solution which contains a polymer.

Further, an antioxidant constituted by 2,4-bis[(octylthio)methyl]-o-cresol (made by Ciba Specialty Chemicals, product name "Irganox 1520") 0.15 part with respect to the obtained polymer 100 parts was added to a solution which contained that polymer, then the mixture was steam stripped to remove the solvent and the result dried in vacuo at 60° C. for 24 hours to obtain a solid Modified Styrene-Butadiene Rubber 1.

The obtained Modified Styrene-Butadiene Rubber 1, when measured by GPC, was comprised of an elution component with an Mn of 259,000, Mw of 297,000, and molecular weight distribution (Mw/Mn) of 1.15 (peak area ratio 37.50), an elution component with an Mn of 571,000, Mw of 579,000, and molecular weight distribution (Mw/Mn) of 1.01 (peak area ratio 31.6%), and an elution component with an Mn of 809,000, Mw of 826,000, and molecular weight distribution (Mw/Mn) of 1.02 (peak area ratio 30.9%) and overall had an Mn of 420,000, Mw of 550,000, and molecular weight distribution (Mw/Mn) of 1.31. Further, by multiangle light scattering measurement, it was confirmed that the branching degree of the peaks at the high molecular weight side was high. Further, the Modified Styrene-Butadiene Rubber 1 had a content of styrene units of 21.7% and had a content of vinyl bonds in the butadiene units of 59.9 mol %. Furthermore, this Modified Styrene-Butadiene Rubber 1 was measured by $^1$H-NMR, whereupon it was confirmed that tris(trimethylsiloxy)silane groups were introduced. Further, this Modified Styrene-Butadiene Rubber 1 was measured for gel weight fraction in accordance with the above method. The results are shown in Table 1.

(Preparation of Rubber Composition)

Next, in a volume 250 ml Brabender type mixer, the above obtained Modified Styrene-Butadiene Rubber 1, 100 parts was kneaded for 30 seconds, then silica (made by Rhodia, product name "Zeosil 1115 MP") 50 parts, process oil (made by Nippon Oil Corporation, product name "Aromax T-DAE") 20 parts, and silane coupling agent: bis(3-(triethoxysilyl)propyl)tetrasulfide (made by Degussa, product name "Si69") 6.0 parts were added, the mixture was kneaded at 110° C. as a starting temperature for 1.5 minutes, then silica (made by Rhodia, product name "Zeosil 1115 MP") 25 part, zinc oxide 3 parts, stearic acid 2 parts, and antioxidant constituted by N-phenyl-N'-(1,3-dimethylbutyl)-p-phenylenediamine (made by Ouchi Shinko Chemical Industrial, product name "Noccelar 6C") 2 parts were added and the mixture further kneaded for 3 minutes then the knead was discharged from the mixer. The temperature of the kneaded matter after finishing kneading was 150° C. Further, the kneaded matter was cooled down to room temperature, then again was kneaded in a Brabender type mixer at a 110° C. as starting temperature for 3 minutes, then the kneaded matter was discharged from the mixer. Next, a 50° C. open roll was used to knead the obtained kneaded matter with sulfur 1.7 parts, a cross-linking accelerator constituted by N-cyclohexyl-2-benzothiazolyl sulfenamide (made by Ouchi Shinko Chemical Industrial, product name "Noccelar CZ-G") 1.8 parts, and a cross-linking accelerator constituted by diphenylguanidine (made by Ouchi Shinko Chemical Industrial, product name "Noccelar D") 1.1 parts, then the sheet-shaped rubber composition was taken out. Further, the obtained rubber composition was cross-linked by pressing at 160° C. for 20 minutes to thereby obtain a rubber cross-linked product, then the obtained rubber cross-linked product (test piece) was evaluated for abrasion resistance and low heat buildup. The results are shown in Table 1. Note that, in Table 1, the results of evaluation of the abrasion resistance and low heat buildup were shown by ratios indexed to the results of the later explained Comparative Example 1 as 100.

Example 2

Production of Modified Styrene-Butadiene Rubber 2

Except for changing the amount of the modifier constituted by tris(trimethylsiloxy)chlorosilane from 0.265 part to 0.1325 part (amount giving 0.5 mol with respect to 1 mol of Li contained in Polymerization Initiator 1), the same procedure was followed as in Example 1 to produce the Modified Styrene-Butadiene Rubber 2. The obtained Modified Styrene-Butadiene Rubber 2, when measured by GPC, was comprised of an elution component with an Mn of 220,000, Mw of 568,000, and molecular weight distribution (Mw/Mn) of 1.17 (peak area ratio 34.2%), an elution component with an Mn of 554,000, Mw of 581,000, and molecular weight distribution (Mw/Mn) of 1.05 (peak area ratio 52.1%), and elution component with an Mn of 1,232,000, Mw of 1,300,000, and molecular weight distribution (Mw/Mn) of 1.05 (peak area ratio 13.7%) and overall had an Mn of 383,000, Mw of 568,000, and molecular weight distribution (Mw/Mn) of 1.48. Further, by multiangle light scattering measurement, it was confirmed that the branching degree of the peaks at the high molecular weight side was high. Further, the Modified Styrene-Butadiene Rubber 2 had a content of styrene units of 21.2% and had a content of vinyl bonds in the butadiene units of 61.3 mol %. Furthermore, this Modified Styrene-Butadiene Rubber 2 was measured by $^1$H-NMR, whereupon it was confirmed that tris(trimethylsiloxy) silane groups were introduced. Further, this Modified Styrene-Butadiene Rubber 2 was measured for gel weight fraction in accordance with the above method. The results are shown in Table 1.

Next, except for using, instead of the Modified Styrene-Butadiene Rubber 1, the Modified Styrene-Butadiene Rubber 2 which was obtained above, the same procedure was followed as in Example 1 to obtain a rubber composition and rubber cross-linked product. The same procedure was followed as in Example 1 to evaluate them. The results are shown in Table 1.

Example 3

Production of Modified Butadiene Rubber

In a nitrogen atmosphere, an autoclave was charged with cyclohexane 800 parts, 1,3-butadiene 120 parts, and tetramethylethylenediamine 0.232 part, then a solution of the Polymerization Initiator 1 which was obtained in Production Example 1 (lithiated 1,3,5-trimethylbenzene) 0.925 part was added (amount of tetramethylethylenediamine present in reaction system being 2.0 mol per 1 mol of n-butyllithium used for lithiation of 1,3,5-trimethylbenzene), then polymerization was initiated at 60° C. The polymerization reaction was continued for 60 minutes. When the polymerization conversion rate was confirmed to become 95% to 100% in range, a modifier constituted by tris(trimethylsiloxy)chlorosilane (in above general formula (5), "j", "k", "m", and "n"=0, $R^1$=Cl, $R^{10}$ to $R^{18}$=$CH_3$) 0.265 part (amount giving 1.0 mol with respect to 1 mol of Li contained in Polymerization Initiator 1) was added and a reaction performed for 30 minutes, then a polymerization terminator constituted by methanol 0.064 part was added to obtain a solution which contains the polymer.

Further, to the obtained polymer 100 parts, an antiaging agent constituted by 2,4-bis[(octylthio)methyl]-o-cresol (made by Ciba Specialty Chemicals, product name "Irganox 1520") 0.15 part was added to the solution which contains the polymer, then the mixture was steam stripped to remove the solvent and the result dried in vacuo at 60° C. for 24 hours to obtain a solid modified butadiene rubber.

The obtained modified butadiene rubber, when measured by GPC, was comprised of an elution component with an Mn of 139,000, Mw of 172,000, and molecular weight distribution (Mw/Mn) of 1.23 (peak area ratio 13.9%), an elution component with an Mn of 301,000, Mw of 304,000, and molecular weight distribution (Mw/Mn) of 1.01 (peak area ratio 7.1%), and an elution component with an Mn of 638,000, Mw of 706,000, and molecular weight distribution (Mw/Mn) of 1.11 (peak area ratio 79.0%) and overall had an Mn of 404,000, Mw of 603,000, and molecular weight distribution (Mw/Mn) of 1.49. Further, by multiangle light scattering measurement, it was confirmed that the branching degree of the peaks at the high molecular weight side was high. Further, the content of vinyl bonds in the butadiene units of this modified butadiene rubber was 71.0 mol %.

Furthermore, this modified butadiene rubber was measured by $^1$H-NMR whereupon it was confirmed that tris(trimethylsiloxy)silane groups were introduced. Further, this modified butadiene rubber was measured for gel weight fraction in accordance with the above method. The results are shown in Table 1.

Next, except for using, instead of the Modified Styrene-Butadiene Rubber 1, the modified butadiene rubber which was obtained above, the same procedure was followed as in Example 1 to obtain a rubber composition and rubber cross-linked product. The same procedure was followed as in Example 1 to evaluate them. The results are shown in Table 1.

Comparative Example 1

Production of Modified Styrene-Butadiene Rubber 3

Except for using, as a modifier, instead of tris(trimethylsiloxy)chlorosilane 0.265 part, tetramethoxysilane 0.487 part (amount giving 4.0 mol with respect to 1 mol of Li contained in Polymerization Initiator 1), the same procedure was followed as in Example 1 to produce the Modified Styrene-Butadiene Rubber 3. The obtained Modified Styrene-Butadiene Rubber 3, when measured by GPC, overall had an Mn of 528,000, Mw of 703,000, and molecular weight distribution (Mw/Mn) of 1.33. Further, this Modified Styrene-Butadiene Rubber 3 had a content of styrene units of 21.7% and had a content of vinyl bonds in the butadiene units of 59.8 mol %. Further, this Modified Styrene-Butadiene Rubber 3 was measured for gel weight fraction in accordance with the above method. The results are shown in Table 1.

Next, except for using, instead of the Modified Styrene-Butadiene Rubber 1, the Modified Styrene-Butadiene Rubber 3 which was obtained above, the same procedure was followed as in Example 1 to obtain a rubber composition and rubber cross-linked product. The same procedure was followed as in Example 1 to evaluate them. The results are shown in Table 1.

Comparative Example 2

Production of Modified Styrene-Butadiene Rubber 4

Except for using, as a modifier, instead of tris(trimethylsiloxy)chlorosilane 0.265 part, trimethylchlorosilane 0.087 part (amount giving 1.0 mol with respect to 1 mol of Li contained in Polymerization Initiator 1), the same procedure was followed as in Example 1 to produce the Modified Styrene-Butadiene Rubber 4. The obtained Modified Styrene-Butadiene Rubber 4, when measured by GPC, overall had an Mn of 544,000, Mw of 741,000, and molecular weight distribution (Mw/Mn) of 1.36. Further, this Modified Styrene-Butadiene Rubber 4 had a content of styrene units of 22.3% and had a content of vinyl bonds in the butadiene units of 60.0 mol %. Further, this Modified Styrene-Butadiene Rubber 4 was measured for gel weight fraction in accordance with the above method. The results are shown in Table 1.

Next, except for using, instead of the Modified Styrene-Butadiene Rubber 1, the Modified Styrene-Butadiene Rubber 4 which was obtained above, the same procedure was followed as in Example 1 to obtain a rubber composition and rubber cross-linked product. The same procedure was followed as in Example 1 to evaluate them. The results are shown in Table 1.

Comparative Example 3

Production of Modified Styrene-Butadiene Rubber 5

Except for using, as a modifier, instead of tris(trimethylsiloxy)chlorosilane 0.265 part, polyorganosiloxane which is expressed by the following formula (6) (where the number of repeating units in the following formula (6) is the average value for all molecules and the copolymerization form was random) 0.086 part (amount giving 1.0 mol with respect to 1 mol of Li contained in Polymerization Initiator 1) in a state of a concentration 22% xylene solution, the same procedure was followed as in Example 1 to produce the Modified Styrene-Butadiene Rubber 5. The obtained Modified Styrene-Butadiene Rubber 5, when measured by GPC, overall had an Mn of 477,000, Mw of 628,000, and molecular weight distribution (Mw/Mn) of 1.32. Further, this Modified Styrene-Butadiene Rubber 5 had a content of styrene units of 21.5% and had a content of vinyl bonds in the butadiene units of 59.6 mol %. Further, this Modified Styrene-Butadiene Rubber 5 was measured for gel weight fraction in accordance with the above method. The results are shown in Table 1.

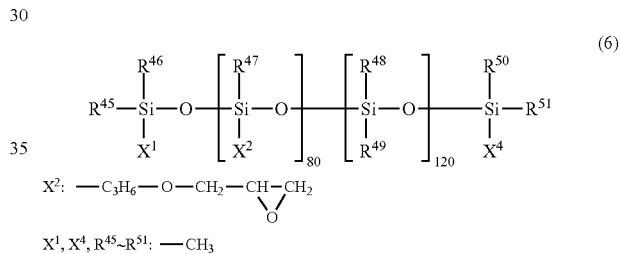

Next, except for using, instead of the Modified Styrene-Butadiene Rubber 1, the Modified Styrene-Butadiene Rubber 5 which was obtained above, the same procedure was followed as in Example 1 to obtain a rubber composition and rubber cross-linked product. The same procedure was followed as in Example 1 to evaluate them. The results are shown in Table 1.

Comparative Example 4

Production of Modified Styrene-Butadiene Rubber 6

Except for using, as a polymerization initiator, instead of the solution of the Polymerization Initiator 1 which was obtained in Production Example 1 (lithiated 1,3,5-trimethylbenzene) 0.925 part, n-butyllithium 0.051 part, the same procedure was followed as in Example 1 to obtain the Modified Styrene-Butadiene Rubber 6. The obtained Modified Styrene-Butadiene Rubber 6, when measured by GPC, overall had an Mn of 259,000, Mw of 265,000, and molecular weight distribution (Mw/Mn) of 1.02. Further, this Modified Styrene-Butadiene Rubber 6 had a content of styrene units of 21.1% and had a content of vinyl bonds in the butadiene units of 59.8 mol %. Further, this Modified Styrene-Butadiene Rubber 6 was measured by $^1$H-NMR, whereupon it was confirmed that tris(trimethylsiloxy)silane groups were introduced. Further, this Modified Styrene-Butadiene Rubber 6 was measured for gel weight fraction in accordance with the above method. The results are shown in Table 1.

Next, except for using, instead of the Modified Styrene-Butadiene Rubber 1, the Modified Styrene-Butadiene Rubber 6 which was obtained above, the same procedure was followed as in Example 1 to obtain a rubber composition and rubber cross-linked product. The same procedure was followed as in Example 1 to evaluate them. The results are shown in Table 1.

TABLE 1

| | Type of polymerization initiator | Type of modifier | Type of modified conjugated diene-based rubber | Modifier/Li (mol ratio) | Gel weight fraction (%) | Low heat buildup | Abrasion resistance |
|---|---|---|---|---|---|---|---|
| Example 1 | Lithiated 1,3,5-trimethylbenzene | Tris(trimethylsiloxy)chlorosilane | Modified Styrene-Butadiene Rubber 1 | 1.0 | 0 | 83 | 127 |
| Example 2 | Lithiated 1,3,5-trimethylbenzene | Tris(trimethylsiloxy)chlorosilane | Modified Styrene-Butadiene Rubber 2 | 0.5 | 0 | 83 | 114 |
| Example 3 | Lithiated 1,3,5-trimethylbenzene | Tris(trimethylsiloxy)chlorosilane | Modified butadiene rubber | 1.0 | 0 | 82 | 110 |
| Comparative Example 1 | Lithiated 1,3,5-trimethylbenzene | Tetramethoxysilane | Modified Styrene-Butadiene Rubber 3 | 4.0 | 60 | 100 | 100 |
| Comparative Example 2 | Lithiated 1,3,5-trimethylbenzene | Trimethylchlorosilane | Modified Styrene-Butadiene Rubber 4 | 1.0 | 0 | 92 | 122 |
| Comparative Example 3 | Lithiated 1,3,5-trimethylbenzene | Polyorganosiloxane | Modified Styrene-Butadiene Rubber 5 | 0.1 | 15 | 94 | 115 |
| Comparative Example 4 | n-Butyllithium | Tris(trimethylsiloxy)chlorosilane | Modified Styrene-Butadiene Rubber 6 | 1.0 | 0 | 250 | 110 |

From Table 1, when using a polymerization initiator constituted by an alkali metalated aromatic compound which has three or more carbon atoms which are directly bonded to alkali metal atoms and aromatic rings in one molecule and using a modifier constituted by a compound of the above general formula (5), the modified conjugated diene-based rubber does not substantially contain a gel content and, further, the rubber cross-linked product which is obtained using this is excellent in low heat buildup and abrasion resistance (Examples 1 to 3).

As opposed to this, when using a modifier constituted by tetramethoxysilane, the obtained modified conjugated diene-based rubber becomes one which contains a gel content and becomes inferior in processability. Further, when made into a rubber cross-linked product, the result became inferior in low heat buildup and abrasion resistance (Comparative Example 1).

Further, when using a modifier constituted by trimethylchlorosilane, the obtained modified conjugated diene-based rubber became one which did not substantially contain a gel content, but when made a rubber cross-linked product, the result became inferior in low heat buildup (Comparative Example 2).

Furthermore, when using a modifier constituted by polyorganosiloxane, the obtained modified conjugated diene-based rubber became one which contains a gel content and becomes inferior in processability. Further, when made into a rubber cross-linked product, the result became inferior in low heat buildup (Comparative Example 3).

Further, when using a polymerization initiator constituted by n-butyllithium, the obtained modified conjugated diene-based rubber became one which did not substantially contain a gel content, but when made into a rubber cross-linked product, the result became extremely inferior in low heat buildup (Comparative Example 4).

The invention claimed is:

1. A method of production of modified conjugated diene-based rubber, comprising:

a first step of using, as a polymerization initiator, an alkali metalated aromatic compound which has three or more carbon atoms which are directly bonded to alkali metal atoms and aromatic rings in one molecule so as to polymerize a monomer which contains at least a conjugated diene compound and obtain a conjugated diene-based rubber which has active ends; and a second step of reacting a compound of the following formula (I) with the active ends of said conjugated diene-based rubber which has active ends,

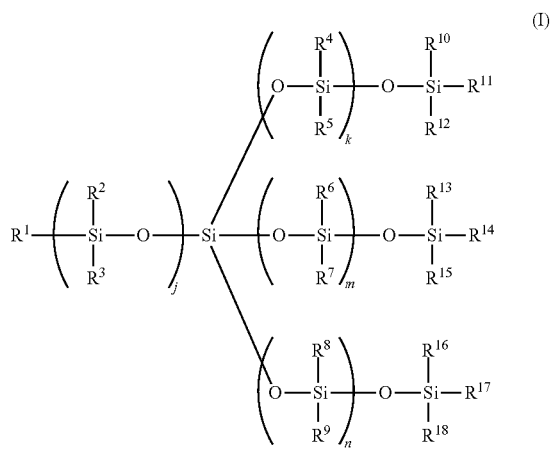

wherein, in the formula (I), any one of $R^1$ and $R^{10}$ to $R^{18}$ is an atom or reactive group which can react with the active ends of said conjugated diene-based rubber which has active ends or a hydrocarbon group which contains one of either said atom or said reactive group, while the remaining among $R^1$ and $R^{10}$ to $R^{18}$ are respectively independently a hydrogen atom, $C_1$ to $C_{10}$ alkyl group, or $C_6$ to $C_{12}$ aryl group, $R^2$ to $R^9$ are respectively independently a hydrogen atom, $C_1$ to $C_{10}$ alkyl group, or $C_6$ to $C_{12}$ aryl group, "j", "k", "m", and "n" are respectively independently integers of 0 to 100.

2. The method of production of modified conjugated diene-based rubber as set forth in claim 1, wherein, in said first step, a monomer which contains an aromatic vinyl compound in addition to said conjugated diene compound is copolymerized.

3. The method of production of modified conjugated diene-based rubber as set forth in claim 1, wherein said alkali metalated aromatic compound is one which is obtained by making an aromatic compound which has three or more carbon atoms which are directly bonded to aromatic rings in one molecule react with an organic alkali metal compound.

4. The method of production of modified conjugated diene-based rubber as set forth in claim 3, wherein said aromatic compound which has three or more carbon atoms which are directly bonded to aromatic rings in one molecule is an aromatic compound of the following formula (II),

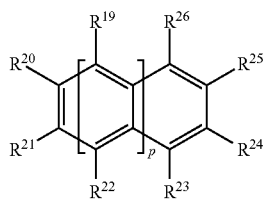

(II)

wherein, in the formula (II), $R^{19}$ to $R^{26}$ are respectively independently a hydrogen atom or $C_1$ to $C_{10}$ alkyl group and three or more of $R^{19}$ to $R^{26}$ are $C_1$ to $C_{10}$ alkyl groups, "p" is an integer of 0 to 5 and, when "p" is 2 or more, regardless of the structure of the above formula (II), three or more present benzene rings may be condensed at any positions with each other.

5. The method of production of modified conjugated diene-based rubber as set forth in claim 1 wherein, in said formula (I), said atom or reactive group which can react with the active ends of the conjugated diene-based rubber which has active ends is a halogen atom, vinyl group, alkoxyl group, amino group, or epoxy group.

6. A modified conjugated diene-based rubber which is obtained by the method of production as set forth in claim 1.

7. A rubber composition containing a rubber ingredient which contains the modified conjugated diene-based rubber as set forth in claim 6 in 100 parts by weight and silica in 10 to 200 parts by weight.

8. The rubber composition as set forth in claim 7 which further contains a cross-linking agent.

9. A rubber cross-linked product obtained by cross-linking the rubber composition as set forth in claim 8.

10. A tire which contains the rubber cross-linked product as set forth in claim 9.

\* \* \* \* \*